March 25, 1930.  W. A. NELLER  1,751,708
PISTON BOSS REAMER
Filed Aug. 12, 1927  2 Sheets-Sheet 2
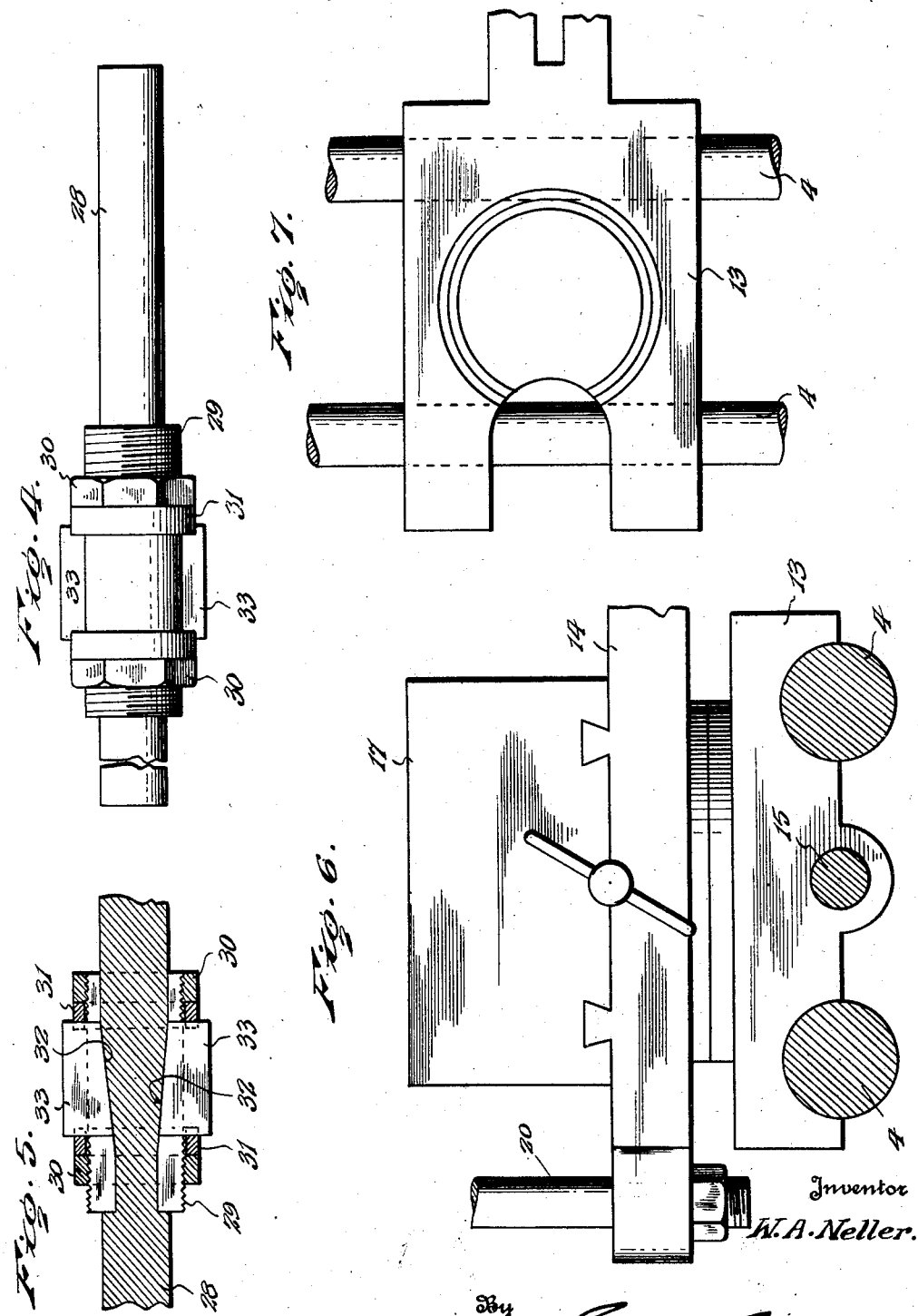

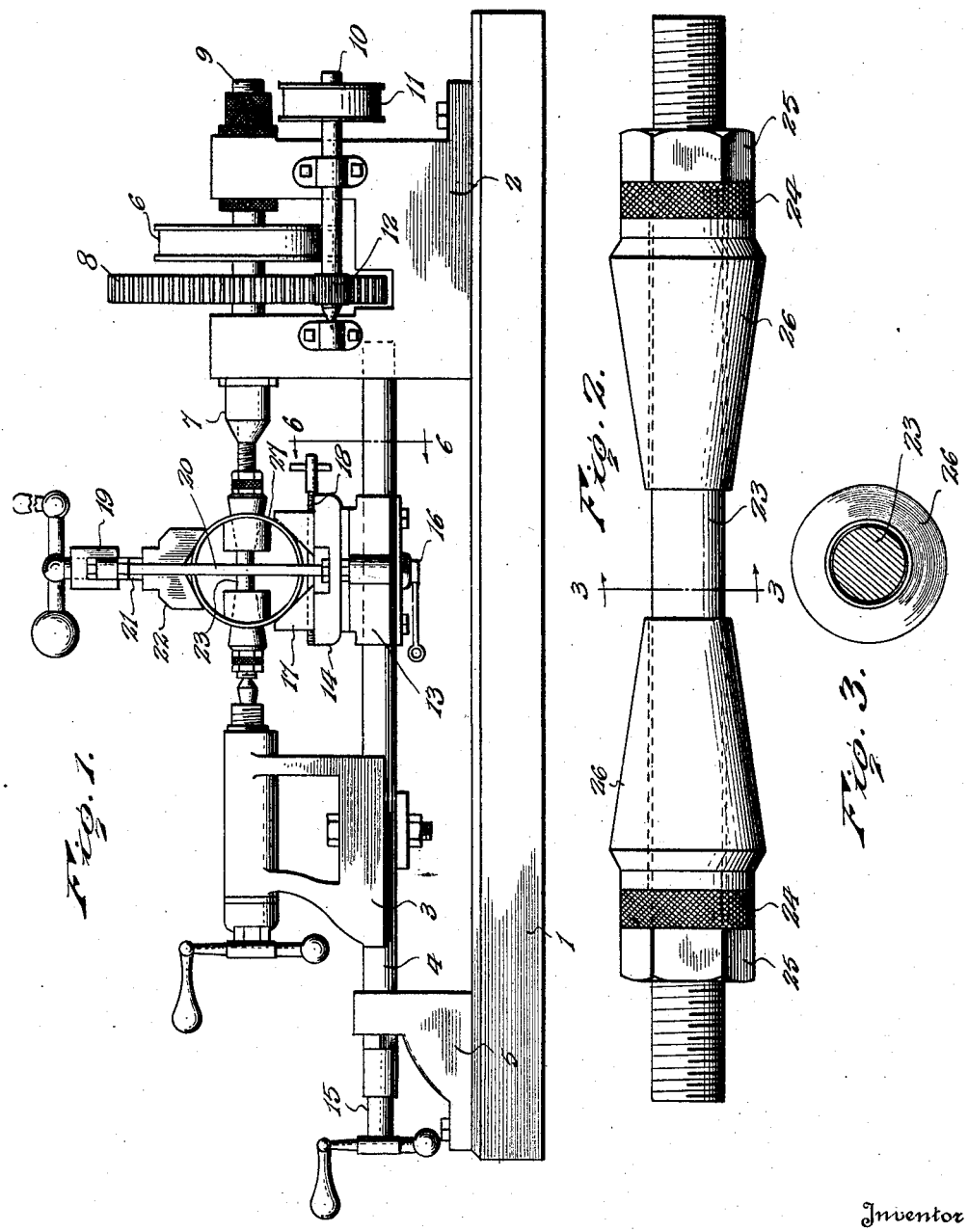

Patented Mar. 25, 1930

1,751,708

UNITED STATES PATENT OFFICE

WALTER A. NELLER, OF ALEXANDRIA, MINNESOTA

PISTON-BOSS REAMER

Application filed August 12, 1927. Serial No. 212,592.

The openings formed in the bosses of pistons to receive the wrist pins wear unequally and after a time become elongated and require truing to receive oversize wrist pins. The reaming of these openings to true them is usually performed by hand and is necessarily slow and tedious.

The present invention has for its primary purpose the provision of a machine whereby the openings in the piston bosses may be rapidly and economically trued at a nominal cost, said machine including a holder for the work, means for centering the parts and an adjustable reamer.

While the drawings illustrate a preferred embodiment of the invention, it is to be understood that in adapting the means to meet specific needs and requirements, the design may be varied and changes in the minor details of construction may be resorted to without departing from the spirit thereof.

For a full understanding of the invention and the merits thereof, reference is to be had to the following description and the drawings hereto attached, in which,—

Figure 1 is a front view of a piston boss reaming machine embodying the invention, showing the centering of a piston preliminary to reaming the bosses.

Figure 2 is an enlarged view of the piston centering device.

Figure 3 is a detail sectional view on the line 3—3 of Figure 2.

Figure 4 is an enlarged plan view of the reaming tool, an intermediate portion of the spindle being broken away.

Figure 5 is a detail sectional view of the reaming tool.

Figure 6 is an enlarged detail sectional view on the line 6—6 of Figure 1, looking to the left as designated by the arrow.

Figure 7 is a top plan view of the work holding carriage, showing the ways upon which it is mounted.

Corresponding and like parts are referred to in the following description and designated in the several views of the drawings by like reference characters.

The working parts of the machine are mounted upon a base 1, and include a head stock 2 and a tail stock 3, the latter being mounted upon ways 4 which are supported at one end by the head stock 2 and at the opposite end by means of a slide base 5. The head stock 2 and the tail stock 3 may be of any preferred construction and receives spindles to which are fitted centers, the spindle of the head stock having a chuck 7 fitted thereto in addition to the center for gripping the reaming tool and causing it to rotate with the power driven spindles. A belt pulley 6 and a gear wheel 8 are fast to the spindle 9 mounted in the head stock 2. A counter shaft 10 mounted upon the head stock 2 is provided with a belt pulley 11 and a pinion 12, the latter meshing with the gear wheel 8. In this manner the spindle 9 may be driven by power applied directly to the pulley 6, or indirectly through the gear elements 8 and 12 by means of power applied to the pulley 11.

The work holder comprises a carriage 13 which is mounted upon the ways 4 and upon which is mounted a base 14. The carriage 13 is adjustable on the ways 4, and is movable by means of the screw 15 in a manner well understood, said screw being mounted in the slide base 5. The base 14 is angularly adjustable on the carriage 13 and is adapted to be secured in the required adjusted position by means of a clamp screw 16. A pair of jaws 17 are mounted upon the base 14, and are adapted to be adjusted by means of a screw 18. A cross piece 19 disposed above the base 14 is connected at its ends to said base by means of rods 20, and receives a screw 21 to the lower end of which a jaw 22 is connected by means of a swivel joint. The work is clamped between the jaws 17 and 22 and is centered by adjustment of the jaws and movement of the base 14.

The means for centering the work includes a spindle 23 having opposite end portions threaded to receive adjusting nuts 24 and clamp nuts 25, whereby oppositely disposed centering cones 26 are adapted to be adjusted and secured in the required position. This centering device is placed between the centers of the head and tail stocks, as indicated most clearly in Figure 1 of the drawings, the centering cones 26 being entered in the openings of the piston bosses. The piston 27 being thus supported, and centered, is gripped by the work holder, which is adjusted to firmly grip the pistons 27 between the jaws 17 and 22. After the piston has been centered and gripped the centering device is removed and the reaming tool placed in position for truing or reaming the openings of the piston bosses.

The reaming tool comprises a spindle 28 formed with an enlarged portion 29 which is externally screw-threaded to receive nuts 30 and washers 31. Longitudinal grooves 32 are formed in the sides of the enlarged portion 29 and provide seats to receive blades 33. The bottoms of the grooves 32 are inclined, as indicated most clearly in Figure 5, whereby to effect outward adjustment of the blade 33 as they are moved longitudinally of the spindle 28. The inner ends of the blades 33 are inclined to correspond with the inclined bottoms of the grooves 32, so that movement of the blades lengthwise of the spindle with their inner edges in contact with the bottoms of the grooves will result in lateral adjustment of the blades to vary the diameter of the cutting portion of the reamer to coincide with the required diameter of the openings formed in the bosses of the pistons. Usually two blades 33 are provided and the blades are oppositely disposed, and their ends are received in notches formed in the washers 31, said blades being clamped by tightening the nuts 30. The blades may be adjusted laterally by backing one of the nuts and advancing the opposite nut, pressure being applied to the outer edges of the blades to move their inner edges in contact with the inclined bottoms of the grooves 32.

After the piston has been centered and clamped by the work holder the centering device is removed and the reaming tool placed in position. The tail stock 3 is moved to admit of removal of the centering device and the substitution therefor of the reaming tool. After the parts have been properly positioned power is applied to the spindles 9 to rotate the reaming tool, the pistons being moved by rotation of the screw 15 to cause the truing portion of the tool to pass through the openings of the bosses and ream the same to the required size.

Having thus described the invention, I claim:

1. A machine of the character specified, comprising head and tail stocks, a work holder and a centering device for the work adapted to be supported between the head and tail stock centers for positioning the work during the adjustment of the holder to grip the same.

2. A machine for truing wrist pin openings in pistons, comprising head and tail stocks provided with spindles and centers, means for rotating the head spindle, a work centering device removably supported between the centers of the head and tail stock spindles, a work holder adjustable between the spindles and comprising adjustable jaws, and a chuck on the head spindle for receiving a cutting tool when the work centering device has been removed.

3. A machine for truing wrist pin openings in pistons, the same comprising a base, a head stock thereon, a slide base, ways supported by the head stock and slide base, a tail stock adjustable on the ways, spindles on the head and tail stocks and provided with centers, a work centering device removably supported between the centers of the head and tail stock spindles, a work holder adjustable between the spindles and comprising adjustable jaws, and a chuck on the head spindle for receiving a cutting tool when the work centering device has been removed.

In testimony whereof I affix my signature.

WALTER A. NELLER. [L. S.]